United States Patent
Suzuki

(10) Patent No.: US 9,184,476 B2
(45) Date of Patent: Nov. 10, 2015

(54) BATTERY MODULE CONTROL SYSTEM AND BATTERY MODULE CONTROL METHOD

(75) Inventor: Shin Suzuki, Sagamihara (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 569 days.

(21) Appl. No.: 13/515,564

(22) PCT Filed: Nov. 26, 2010

(86) PCT No.: PCT/JP2010/071174
§ 371 (c)(1),
(2), (4) Date: Jun. 13, 2012

(87) PCT Pub. No.: WO2011/074390
PCT Pub. Date: Jun. 23, 2011

(65) Prior Publication Data
US 2012/0293112 A1   Nov. 22, 2012

(30) Foreign Application Priority Data

Dec. 17, 2009   (JP) .................................. 2009-285816

(51) Int. Cl.
*H02J 7/00*   (2006.01)
*H01M 10/48*  (2006.01)
(Continued)

(52) U.S. Cl.
CPC ........... *H01M 10/482* (2013.01); *H02J 7/0019* (2013.01); *H01M 10/0525* (2013.01);
(Continued)

(58) Field of Classification Search
USPC ......... 320/116, 125, 118, 119, 120, 121, 122, 320/133, 134
See application file for complete search history.

(56) References Cited

U.S. PATENT DOCUMENTS 5,828,201 A * 10/1998 Hoffman et al. ............. 320/104
6,066,939 A *  5/2000 Nagai et al. .................. 320/128
(Continued)

FOREIGN PATENT DOCUMENTS

CN   101359035 A    2/2009
EP   1786057 A2    5/2007
(Continued)

OTHER PUBLICATIONS

Communication dated Jan. 23, 2014, issued by the State Intellectual Property Office of the People's Republic of China in corresponding Application No. 201080057341.2.
(Continued)

*Primary Examiner* — Brian Ngo
(74) *Attorney, Agent, or Firm* — Sughrue Mion, PLLC

(57) ABSTRACT

In order to provide a battery module control system able to reuse an arbitrary secondary battery module through a simple, inexpensive system, the present invention includes: a plurality of battery modules that are connected to each other in parallel; switch circuits that are provided on charge and discharge routes of a plurality of the battery modules; an average impedance value calculation section (control section) that calculates average impedance values of a plurality of the battery modules; a maximum allowable charge-and-discharge rate input section (input section) that inputs maximum allowable charge-and-discharge rates of a plurality of the battery modules; an allowable voltage difference calculation section (control section) that calculates allowable voltage differences of a plurality of the battery modules on the basis of the average impedance values calculated by the average impedance value calculation section and the maximum allowable charge-and-discharge rates input by the maximum allowable charge-and-discharge rate input section; a common voltage detection section (control section) that detects a voltage of a common charge and discharge route of a plurality of the battery modules; and a plurality of voltage detection sections (control section) that detect voltages of a plurality of the battery modules, wherein, when a difference between the voltage detected by the common voltage detection section and the voltage detected by the voltage detection section corresponding to a predetermined battery module is greater than an allowable voltage difference of the predetermined battery module, a switch circuit provided on a charge and discharge route of the predetermined battery module is so controlled as to be turned OFF.

5 Claims, 6 Drawing Sheets

(51) Int. Cl.
  *H01M 10/0525* (2010.01)
  *H01M 10/06* (2006.01)
  *H01M 10/34* (2006.01)

(52) U.S. Cl.
  CPC ............ *H01M10/06* (2013.01); *H01M 10/345* (2013.01); *Y02T 10/7011* (2013.01); *Y02T 10/7016* (2013.01); *Y02T 10/7055* (2013.01); *Y02W 30/84* (2013.01)

(56) References Cited

U.S. PATENT DOCUMENTS

| | | | |
|---|---|---|---|
| 7,573,234 B1* | 8/2009 | Tsukamoto et al. | 320/116 |
| 2006/0152196 A1* | 7/2006 | Matsumoto et al. | 320/132 |
| 2007/0170889 A1* | 7/2007 | Ishikawa et al. | 320/116 |

FOREIGN PATENT DOCUMENTS

| | | |
|---|---|---|
| JP | 2004-236473 A | 8/2004 |
| JP | 2005-168259 A | 6/2005 |
| JP | 2007-141464 A | 6/2007 |
| JP | 2009-022099 A | 1/2009 |

OTHER PUBLICATIONS

Moo et al., "Investigation on Parallel Operating Features of Battery Power Modules", The 10$^{th}$ Academic Conference Proceedings, Power Electronics Society of China Electrotechnology Society, Sep. 24, 2006, 6 total pages.

Communication dated Jul. 25, 2014, from the State Intellectual Property Office of the People's Republic of China in counterpart Chinese Application No. 201080057341.2.

* cited by examiner

FIG. 2

Charge-and-discharge log data

| Time | Charge/discharge | Detected current values | | | Detected voltage values | | | |
|---|---|---|---|---|---|---|---|---|
| t | c/d | $A_1$ | $A_2$ | $A_3$ | $V_1$ | $V_2$ | $V_3$ | $V_{com}$ |
| | | | | | | | | |

(A)

Module data table

| Module (n) | Battery capacity | DC impedance average value | Charge-and-discharge rate | Maximum allowable charge-and-discharge rate | Allowable voltage difference |
|---|---|---|---|---|---|
| n=1 | $Ah_1$ | $Z_1$ | $C_1$ | $C_{max1}$ | $\Delta V_1$ |
| n=2 | $Ah_2$ | $Z_2$ | $C_2$ | $C_{max2}$ | $\Delta V_2$ |
| n=3 | $Ah_3$ | $Z_3$ | $C_3$ | $C_{max3}$ | $\Delta V_3$ |

(B)

FIG. 5
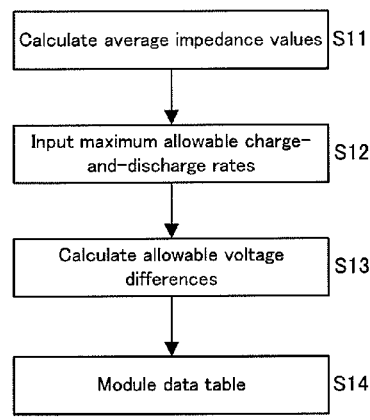
(A)
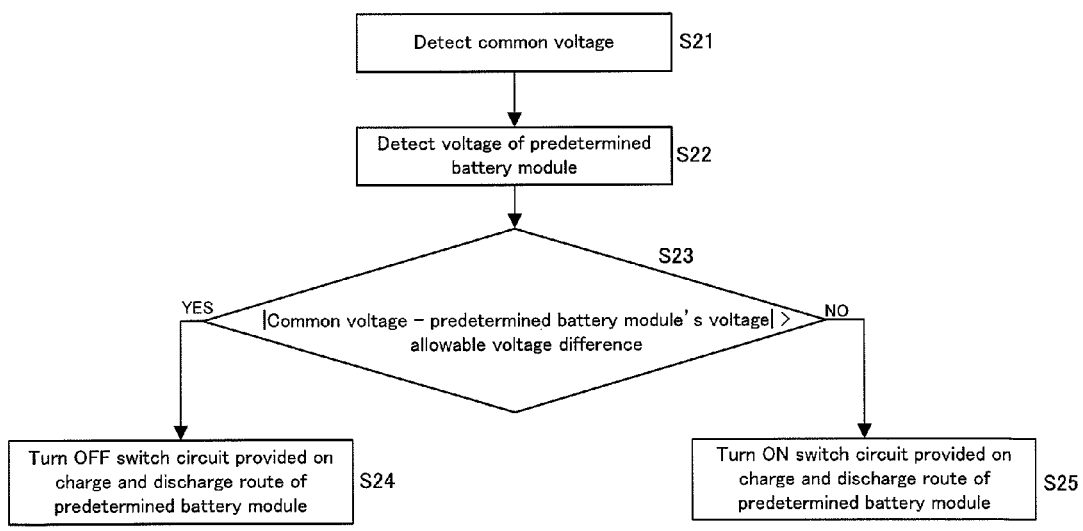
(B)

FIG. 6
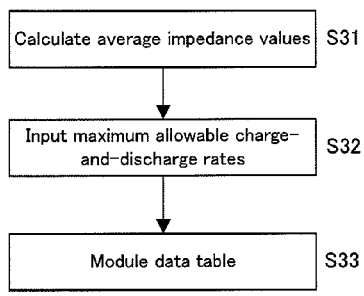
(A)
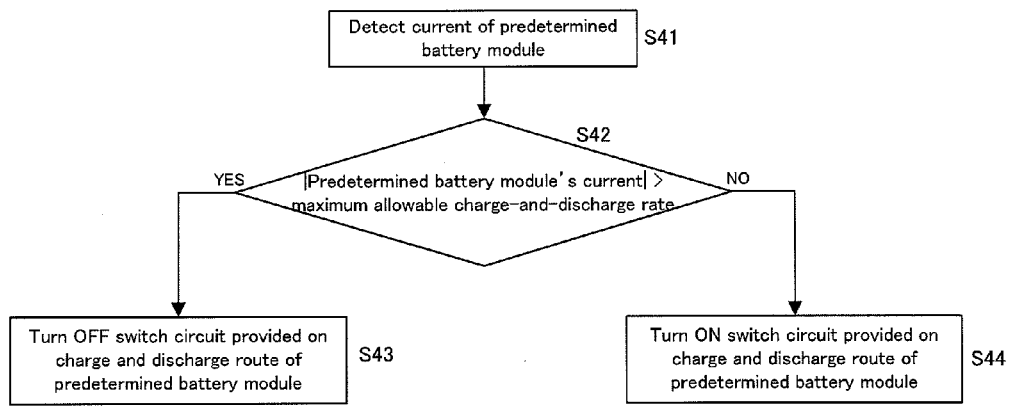
(B)

BATTERY MODULE CONTROL SYSTEM AND BATTERY MODULE CONTROL METHOD

CROSS REFERENCE TO RELATED APPLICATIONS

This application is a National Stage of International Application No. PCT/JP2010/071174 filed on Nov. 26, 2010, which claims priority from Japanese Patent Application No. 2009-285816, filed on Dec. 17, 2009, the contents of all of which are incorporated herein by reference in their entirety.

BACKGROUND OF THE INVENTION

The present invention relates to a battery module control system and a battery module control method which are used to control a battery module including one or more battery cells.

It is expected that, as awareness of environmental problems grows, vehicles driven by electric motors, such as electric vehicles (EV) and hybrid electric vehicles (HEV), systems that store electricity generated from sunlight, or the like will rapidly become popular. In such vehicles and electricity storage systems, lithium ion batteries, nickel-metal hydride batteries, lead batteries or any other secondary batteries are used. In the future, it is expected that large amounts of batteries used once in the vehicles or electricity storage systems will be collected. Various measures for effectively reusing the collected, used batteries are now under consideration.

By the way, as is commonly said, when a plurality of batteries connected are used, it is prohibited to use batteries that are different in degradation level, capacity and other characteristics in such a way that the batteries are connected in parallel. The reason is that, when the charge and discharge associated with a reverse current between batteries become large, the reverse current involves risks, such as heat generation. Accordingly, when batteries that are different in capacity characteristics are connected in parallel and used, safety needs to be guaranteed by means of a reverse current prevention function or the like. However, even when the reverse current prevention function is provided, large variations in capacity between batteries could lead to dependence on a battery having the worst degradation level (or a small capacity). Therefore, it tends to be impossible to extract the original capacity.

Depending on usage histories, the batteries are different in degradation level, capacity and other characteristics. Therefore, when a battery module is reused, it is necessary to somehow acquire data about the collected battery module. The methods to acquire the data have been so far proposed.

For example, what is disclosed in Patent Document 1 (JP-A-2007-141464) is a battery information management device, which includes a battery information storage section that stores, as battery information, at least electrical characteristic information of the battery information management device or usage history information and which is connected to a secondary battery module, with the battery information management device also including: an information processing section, which is so formed as to contain at least a CPU and a memory; an output section, which outputs an information processing result by the information processing section; and an interface section, which connects the secondary battery module to the information processing section. The information processing section uses the interface section to read the battery information, which is stored in the battery information storage section of the secondary battery module, and classifies the battery information according to grade on the basis of one or more threshold values that are separately defined in advance and of the battery information read in order to reuse the secondary battery module. The classified-by-grade information, which is obtained as a result of classifying according to grade, is output to the output section. The battery information management device also includes a battery information database, which accumulates the battery information read by the interface section in such a way that the battery information becomes associated with identification information of the secondary battery module that outputs the battery information.

According to what is disclosed in Patent Document 1, it is necessary to provide the secondary battery module with the battery information storage section, in which the battery information, such as electrical characteristic information of the battery information management device or usage history information, is stored, or to provide the device with a section that reads the battery information stored in the battery information storage section. Therefore, the problem is that the configuration required to reuse the secondary battery module becomes extremely complicated and expensive. Moreover, the reusable secondary battery module is provided with the battery information storage section that complies with the standards as described above. Therefore, the problem is that an arbitrary secondary battery module cannot be reused.

SUMMARY OF THE INVENTION

To solve the above problems, a battery module control system of the present invention includes: a plurality of battery modules that are connected to each other in parallel; switch circuits that are provided on charge and discharge routes of a plurality of the battery modules; an average impedance value calculation section that calculates average impedance values of a plurality of the battery modules; a maximum allowable charge-and-discharge rate input section that inputs maximum allowable charge-and-discharge rates of a plurality of the battery modules; an allowable voltage difference calculation section that calculates allowable voltage differences of a plurality of the battery modules on the basis of the average impedance values calculated by the average impedance value calculation section and the maximum allowable charge-and-discharge rates input by the maximum allowable charge-and-discharge rate input section; a common voltage detection section that detects a voltage of a common charge and discharge route of a plurality of the battery modules; and a plurality of voltage detection sections that detect voltages of a plurality of the battery modules, wherein, when a difference between the voltage detected by the common voltage detection section and the voltage detected by the voltage detection section corresponding to a predetermined battery module is greater than an allowable voltage difference of the predetermined battery module, a switch circuit provided on a charge and discharge route of the predetermined battery module is so controlled as to be turned OFF.

Moreover, a battery module control system of the present invention includes: a plurality of battery modules that are connected to each other in parallel; switch circuits that are provided on charge and discharge routes of a plurality of the battery modules; an average impedance value calculation section that calculates average impedance values of a plurality of the battery modules; a maximum allowable charge-and-discharge rate input section that inputs maximum allowable charge-and-discharge rates of a plurality of the battery modules; and a plurality of current detection sections that detect currents flowing through the charge and discharge routes of a plurality of the battery modules, wherein, when an absolute value of a current value detected by the current detection section corresponding to a predetermined battery module is greater than a maximum allowable charge-and-discharge rate of the predetermined battery module, a switch circuit provided on a charge and discharge route of the predetermined battery module is so controlled as to be turned OFF.

Moreover, in the battery module control system of the present invention, a plurality of the battery modules are produced at different times.

Moreover, in the battery module control system of the present invention, usage histories of a plurality of the battery modules are different.

Moreover, in the battery module control system of the present invention, standards of a plurality of the battery modules are different.

Moreover, a battery module control method of the present invention includes the steps of: using a common voltage detection section to detect a voltage of a common charge and discharge route of a plurality of battery modules connected in parallel; using a plurality of voltage detection sections to detect voltages of a plurality of the battery modules; and controlling and turning off a switch circuit provided on a charge and discharge route of a predetermined battery module when a difference between the voltage detected by the common voltage detection section and the voltage detected by the voltage detection section corresponding to the predetermined battery module is greater than an allowable voltage difference of the predetermined battery module.

Moreover, a battery module control method of the present invention includes the steps of: using a plurality of current detection sections to detect currents flowing through charge and discharge routes of a plurality of battery modules connected in parallel; and controlling and turning off a switch circuit provided on a charge and discharge route of a predetermined battery module when an absolute value of a current value detected by the current detection section corresponding to the predetermined battery module is greater than a maximum allowable charge-and-discharge rate of the predetermined battery module.

According to the battery module control system and battery module control method of the present invention, allowable voltage differences of secondary battery modules are acquired through actual usage or the like. The switch circuits provided on charge and discharge routes of the secondary battery modules are so controlled that voltages larger than the allowable voltage differences are not applied to the secondary battery modules. As a result, the use of the secondary battery modules in a safe usage range is guaranteed. Therefore, without providing a storage section or the like in the secondary battery modules to store a usage history thereof and the like, it is possible to reuse the secondary battery modules through a simple, inexpensive system.

Moreover, according to the battery module control system and battery module control method of the present invention, a switch circuit is controlled on the basis of the allowable voltage difference as described above. Therefore, the safe use of an arbitrary secondary battery module is guaranteed. Even when a battery information storage section that is compliant with the standards is not provided, it is therefore possible to reuse an arbitrary secondary battery module.

BRIEF DESCRIPTION OF THE DRAWINGS

FIG. 2 is a diagram illustrating a data structure of a charge-and-discharge log data/module data table storage section in the battery module control system according to the embodiment of the present invention.

FIG. 5 is diagrams showing a summary of processing steps in the battery module control system according to the embodiment of the present invention.

FIG. 6 is diagrams showing a summary of processing steps in the battery module control system according to the embodiment of the present invention.

DESCRIPTION OF EXEMPLARY EMBODIMENTS

Figure 1:
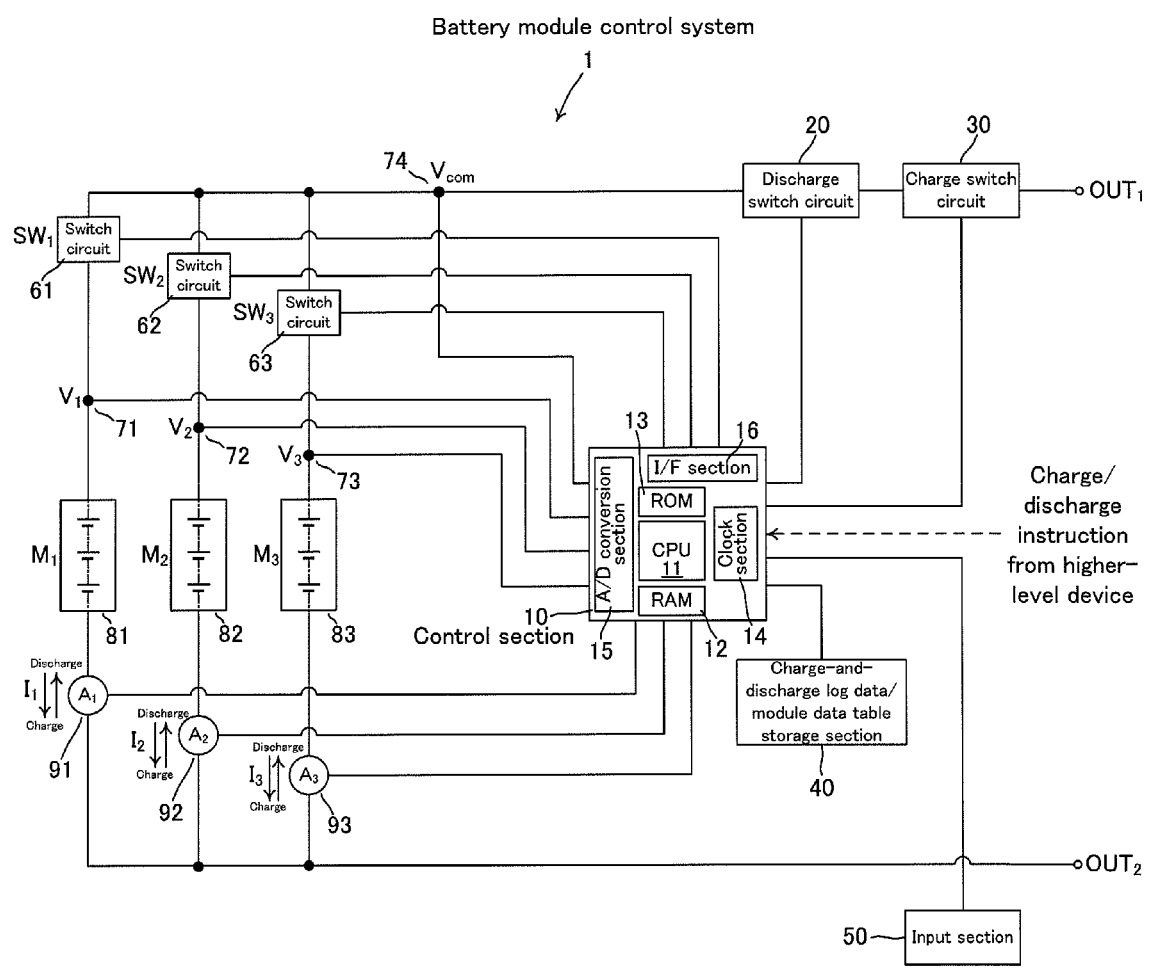
FIG. 1 is a schematic diagram showing the circuit configuration of a battery module control system according to an embodiment of the present invention.

Hereinafter, an embodiment of the present invention will be described with reference to the accompanying drawings. FIG. 1 is a schematic diagram showing the circuit configuration of a battery module control system according to an embodiment of the present invention. FIG. 1 denotes a battery module control system 1, a control section 10, a CPU 11, a RAM 12, a ROM 13, a clock section 14, an A/D conversion section 15, an interface section 16, a discharge switch circuit 20, a charge switch circuit 30, a charge-and-discharge log data/module data table storage section 40, an input section 50, switch circuits 61, 62 and 63, voltage detection terminals 71, 72, 73 and 74, battery modules 81, 82 and 83, and current detection sections 91, 92 and 93.

The battery module control system 1 is a system that charges battery modules $M_1$, $M_2$ and $M_3$, discharges the modules, or stops the charging or discharging in response to charge instructions/discharge instructions or charge stopping instructions/discharge stopping instructions from a higher-level device not shown in the diagram. The system controls the charging and discharging of the battery modules $M_1$, $M_2$ and $M_3$, which are connected to the battery module control system 1. In this case, the number of battery modules under the control of the battery module control system 1 of the embodiment of the present invention may not be three as in the present embodiment; any number of battery modules, which is greater than or equal to one, can be controlled. Moreover, the battery module control system 1 is able to control a battery module that is formed by combining any kinds of secondary battery cells. That is, in the case of the present embodiment, the types and standards of the battery modules $M_1$, $M_2$ and $M_3$ may be different. Moreover, battery modules controlled by the battery module control system 1 may be used battery modules, which have already had usage histories, or new ones. More specifically, as for the battery modules controlled by the battery module control system 1, the battery modules may be produced at different times; the usage histories of the battery modules may be different; or the standards of the battery modules may be different.

Through the actual use thereof or the like, the battery module control system 1 of the present invention acquires the allowable voltage differences of the battery modules $M_1$, $M_2$ and $M_3$. The battery module control system 1 controls switch circuits $SW_1$, $SW_2$ and $SW_3$, which are provided on charge and discharge routes of the battery modules $M_1$, $M_2$ and $M_3$, in such a way that the voltage applied to each of the battery modules $M_1$, $M_2$ and $M_3$ does not exceed the allowable voltage difference. Therefore, the use of the battery modules in a safe usage range is guaranteed. Accordingly, as described above, the battery modules controlled by the battery module control system 1 may be produced at different times; the usage histories of the battery modules may be different; or the standards of the battery modules may be different. Incidentally, definitions of the allowable voltage difference and the like will be described below.

The battery module control system 1 of the embodiment of the present invention includes the battery modules $M_1$, $M_2$ and $M_3$; the current detection sections $A_1$, $A_2$ and $A_3$, which include a resistor and the like to detect current at the time of the charging and discharging of each of the battery modules $M_1$, $M_2$ and $M_{ai}$; the switch circuits $SW_1$, $SW_2$ and $SW_3$, which are provided on the charge and discharge routes of the battery modules $M_1$, $M_2$ and $M_3$ and which control the charging and discharging of each of the battery modules $M_1$, $M_2$ and $M_3$; the control section 10, which monitors and controls the charging and discharging of the battery modules $M_1$, $M_2$ and $M_3$; the discharge switch circuit 20 and the charge switch circuit 30, which include an FET to take overall control of the charging and discharging of the battery modules $M_1$, $M_2$ and $M_3$; the charge-and-discharge log data/module data table storage section 40, which stores data about the battery modules $M_1$, $M_2$ and $M_3$; and the input section 50, which is used when a user or the like inputs predetermined information to the control section 10.

What is provided in the control section 10 is the A/D conversion section 15, which converts the following values into digital values, which can be processed by the CPU (Central Processing Unit) 11 and the like: each of terminal voltage values $V_1$, $V_2$, $V_3$ and $V_{com}$ at voltage detection terminals 71, 72, 73 and 74; and current values $I_1$, $I_2$ and $I_3$ at the current detection sections 91, 92 and 93, which are provided on the charge and discharge routes of the individual battery modules $M_1$, $M_2$ and $M_3$. Incidentally, the terminal voltage value $V_{com}$ at 74 represents a charge and discharge voltage value of the entire battery module control system 1.

Then, an output from the A/D conversion section 15 is input to the CPU 11, which serves as a control section, where calculation, comparison, determination and the like are carried out. In accordance with a signal from the CPU 11, the discharge switch circuit 20, the charge switch circuit 30, and the switch circuits $SW_1$, $SW_2$ and $SW_3$, which include switching transistors and the like, are on-off controlled.

What is also provided in the control section 10 is a memory on which various kinds of data that the CPU 11 processes are recorded. The RAM (Random Access Memory) 12 temporarily stores various kinds of data, including part of a program. In the ROM (Read Only Memory) 13, which is a nonvolatile storage medium equipped with a program memory where a program for controlling an operation of the battery module control system 1 is stored, data required at a time when the program is executed, and the like are stored in advance.

What is also provided in the control section 10 is the clock section 14, which includes various kinds of timer and which is used to measure the time or perform other operations. The interface section 16 of the control section 10 controls inputs to, or outputs from, the charge-and-discharge log data/module data table storage section 40 and the input section 50, which are components outside of the control section 10.

The charge-and-discharge log data/module data table storage section 40 is made up of a rewritable nonvolatile memory, such as an EEPROM (Electrically Erasable Programmable ROM) or a Flash Memory. The charge-and-discharge log data/module data table storage section 40 stores charge-and-discharge log data, in which the charge and discharge histories of the battery modules $M_1$, $M_2$ and $M_3$ are recorded, and a module data table, in which the characteristics of the battery modules $M_1$, $M_2$ and $M_3$ are stored.

The input section 50 is an input section, such as a touch panel, which enables a user to input data about the battery modules $M_1$, $M_2$ and $M_3$.

FIG. 2 is a diagram illustrating a data structure of the charge-and-discharge log data/module data table storage section 40 in the battery module control system according to the embodiment of the present invention.

FIG. 2A shows the data structure of the charge-and-discharge log data. In the charge-and-discharge log data, the following data are recorded: data that correspond to the time data obtained by the clock section 14 and are about whether the battery module control system 1 carries out charging or discharging; data of the current values $I_1$, $I_2$ and $I_3$ at the current detection sections 91, 92 and 93, which are provided on the charge and discharge routes of the individual battery modules $M_1$, $M_2$ and $M_3$; and data of each of the terminal voltage values $V_1$, $V_2$, $V_3$ and $V_{com}$ at the voltage detection terminals 71, 72, 73 and 74.

FIG. 2B shows a table as to the characteristics of each of the battery modules $M_1$, $M_2$ and $M_3$, which are calculated from the above charge-and-discharge log data that have been so far recorded. As examples of data that are managed on the module data table shown in FIG. 2B, the following can be listed; "n," which represents an ID number of a battery module (n=1, 2 and 3 in the case of the present embodiment); battery capacities ($Ah_1$, $Ah_2$ and $Ah_3$) of the battery modules; average values ($Z_1$, $Z_2$ and $Z_3$) of DC impedance of the battery modules; charge-and-discharge rates ($C_1$, $C_2$ and $C_3$) of the battery modules; maximum allowable charge-and-discharge rates ($Cmax_1$, $Cmax_2$ and $Cmax_3$) of the battery modules; and allowable voltage differences ($\Delta A_1$, $\Delta V_2$ and $\Delta V_3$) of the battery modules.

When a new battery module is set up in the battery module control system 1, what is input as a value used for the module data table is a value that is sufficiently safe to be used in any battery module. Moreover, log data are acquired when the battery module control system 1 is actually used. Therefore, the battery module control system 1 can be operated in a way that updates the module data table when necessary.

The battery capacities ($Ah_1$, $Ah_2$ and $Ah_3$) are calculated by the CPU 11 using a well-known method, such as a current integration method or a voltage method, on the basis of charge-and-discharge log data during an idle time or at a time when the charging and discharging are completed, and are updated when necessary. Incidentally, when a new battery module (regardless of whether the battery module is a new or used one) is set up in the battery module control system 1, the battery module control system 1 may be so programmed, as an initial setting, as to discharge the fully-charged battery module before calculating the battery capacity. Alternatively, the battery module control system 1 may calculate the battery capacity from the charge-and-discharge log data obtained by actual usage.

The average values ($Z_1$, $Z_2$ and $Z_3$) of DC impedance are direct-current internal resistances of the battery modules, which are calculated by dividing the voltage values of the battery modules by current values and averaging the resulting values in an accumulative manner. The DC impedance average values are similarly calculated by the CPU 11 from the charge-and-discharge log data when necessary, and are updated.

A charge-and-discharge rate of 1 C is a current value at which a cell having a capacity of a nominal capacity value is discharged at constant current and the discharging is completed for one hour. For example, in a battery module whose nominal capacity value is 2.5 Ah, 1 C turns out to be 2.5 A. Moreover, in this case, in the battery module, 0.2 C turns out to be 0.5 A.

The charge-and-discharge rates ($C_1$, $C_2$ and $C_3$) of the battery modules controlled by the module data table are the charge-and-discharge rates (Unit: ampere) of the battery modules $M_1$, $M_2$ and $M_3$, respectively. The charge-and-discharge rates ($C_1$, $C_2$ and $C_3$) can be each calculated as X[A] (=1C) from the battery capacity X[Ah], which is calculated from the battery capacity of the module data table.

A maximum allowable charge-and-discharge rate is used to define a maximum current, or what the value of C is, with which a certain battery module can be charged and discharged. For example, in a battery module whose nominal capacity value is 2.5 Ah, 1 C turns out to be 2.5 A. However, when the maximum allowable charge-and-discharge rate of the battery module is 2 C, the maximum allowable charge-and-discharge current is 5 A.

Moreover, the maximum allowable charge-and-discharge rates ($Cmax_1$, $Cmax_2$ and $Cmax_3$) of the battery modules controlled by the module data table are the maximum allowable charge-and-discharge rates (Unit: ampere) of the above battery modules $M_1$, $M_2$ and $M_3$, respectively. It is desirable that the maximum allowable charge-and-discharge rates ($Cmax_1$, $Cmax_2$ and $Cmax_3$) be input by a user through the input section 50 and be set to the table. Or alternatively, instead of being input by a user through the input section 50 as described above, the battery module control system 1 may be so structured as to automatically acquire information offered from a Web site on the Internet or the like.

Incidentally, when data about the maximum allowable charge-and-discharge rates of the battery modules cannot be acquired, the values of charge-and-discharge rates on the module data table may be directly used. The reason is that, in any battery module, it is considered possible for at least a current equivalent to 1 C to flow therethrough.

The allowable voltage differences ($\Delta V_1$, $\Delta V_2$ and $\Delta V_3$) of the battery modules are voltage values that can be calculated by the products of the maximum allowable charge-and-discharge rates of the battery modules and of the DC impedance average values of the battery modules. Regardless of whether a battery module is a new or reused product, in the charge and discharge process of the battery module, the battery module can be used safely by complying with the following two points: that a voltage difference exceeding an allowable voltage difference thus defined is not applied to the battery module; and that a current exceeding a maximum allowable charge-and-discharge rate does not flow through the battery module. In the battery module control system 1 of the embodiment of the present invention, the switch circuits $SW_1$, $SW_2$ and $SW_3$ are so controlled as to comply with the above two points. Therefore, without providing a storage section or the like in the battery module to store a usage history thereof and the like, it is possible to reuse the secondary battery module through a simple, inexpensive system. Moreover, regardless of whether an arbitrary battery module is a used or new one, it is possible to reuse the battery module.

Figure 3:
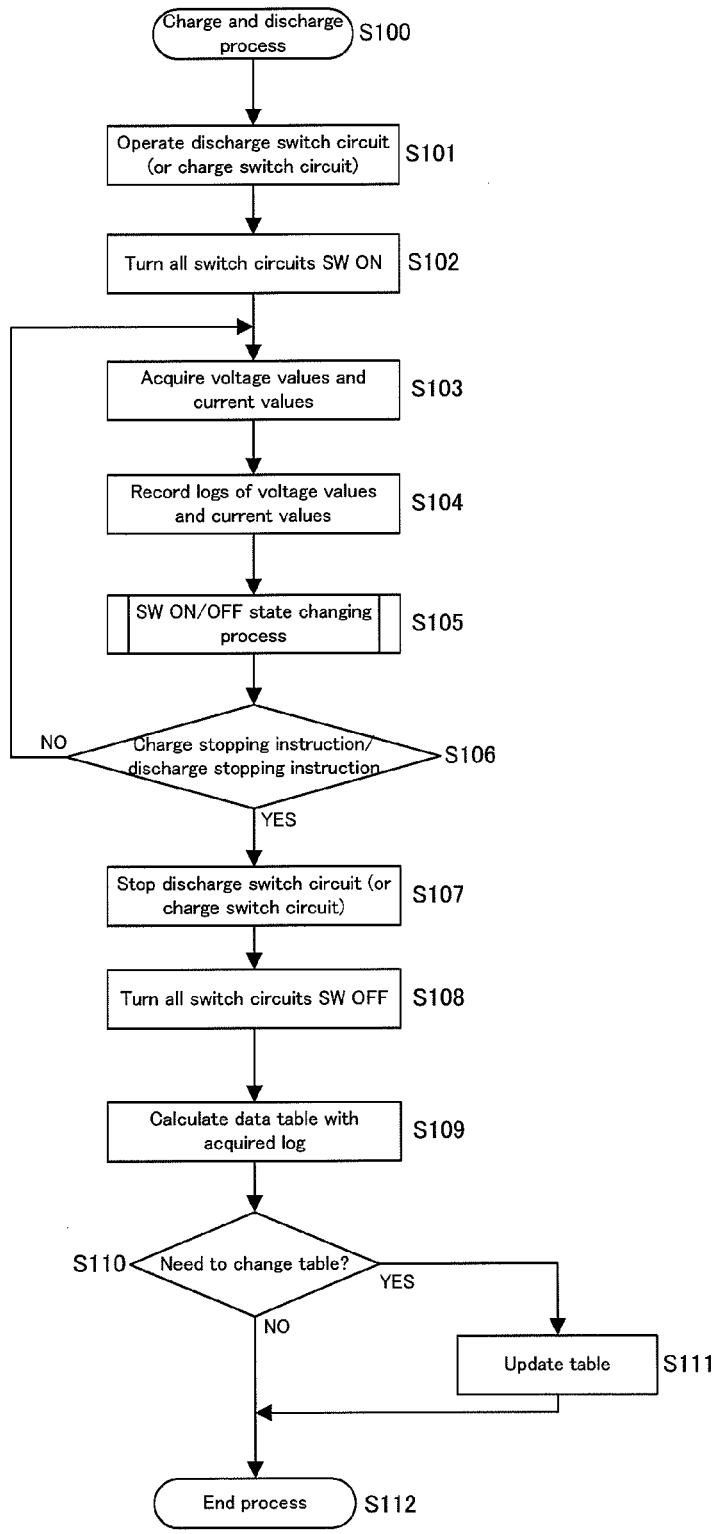
FIG. 3 is a diagram showing a flowchart of a charge and discharge process of the battery module control system according to the embodiment of the present invention.

The following describes a charge and discharge operation of the battery module control system 1 having the above-described configuration with reference to a flowchart. FIG. 3 is a diagram showing a flowchart of a charge and discharge process of the battery module control system 1 according to the embodiment of the present invention. In FIG. 1, when a discharge instruction (or a charge instruction) is input from a higher-level device (not shown) to the control section 10 of the battery module control system 1, a charge and discharge process starts at step S100.

After step S100, the process proceeds to step S101; when the instruction input is a discharge instruction, the discharge switch circuit 20 is put into operation (When the instruction is a charge instruction, the charge switch circuit 30 is put into operation). At the next step S102, all the switch circuits $SW_1$, $SW_2$ and $SW_3$, which are provided on the charge and discharge routes of the individual battery modules $M_1$, $M_2$ and $M_3$, are turned ON.

At the next step S103, the voltage values $V_1$, $V_2$, $V_3$ and $V_{com}$ at the voltage detection terminals, and the current values $I_1$, $I_2$ and $I_3$ at the current detection sections $A_1$, $A_2$ and $A_3$ are acquired. At the subsequent step S104, along with clock data obtained by the clock section 14, the acquired voltage values $V_1$, $V_2$, $V_3$ and $V_{com}$ and current values $I_1$, $I_2$ and $I_3$ are recorded on the charge-and-discharge log data/module data table storage section 40.

At step S105, a subroutine of a SW ON/OFF state changing process is performed. The subroutine will be described later in detail.

At step S106, a determination is made as to whether or not a charge stopping instruction (or a discharge stopping instruction) has been input to the control section 10 from a higher-level device, which is not shown in the diagram. When the determination result at step S106 is NO, the process returns to step S103 to make a loop.

Meanwhile, when the determination result at step S106 is YES, the process proceeds to step S107. At step S107, the discharge switch circuit 20 (or the charge switch circuit 30) is stopped. At the subsequent step S108, all the switch circuits $SW_1$, $SW_2$ and $SW_3$, which are provided on the charge and discharge routes of the individual battery modules $M_1$, $M_2$ and $M_3$, are turned OFF.

At step S109, on the basis of a log acquired by the discharging process (or the charging process) at this time (i.e. what is recorded in the charge-and-discharge log data/module data table storage section 40), the values of the "battery capacities" and the "DC impedance average values" of the battery modules $M_1$, $N_2$ and $M_3$ are calculated.

Then, at step S110, a comparison is made between the values of the module data table that have been so far recorded, the values of the "battery capacities" that are calculated at this time, and the "DC impedance average values." Then, a determination is made as to whether or not there is the need to change the module data table that has so far been recorded. When the determination result at step S110 is YES, the process proceeds to step S111, and the module data table stored in the charge-and-discharge log data/module data table storage section 40 is updated. When the determination result is NO, the process proceeds to step S112, where the process comes to an end.

Figure 4:
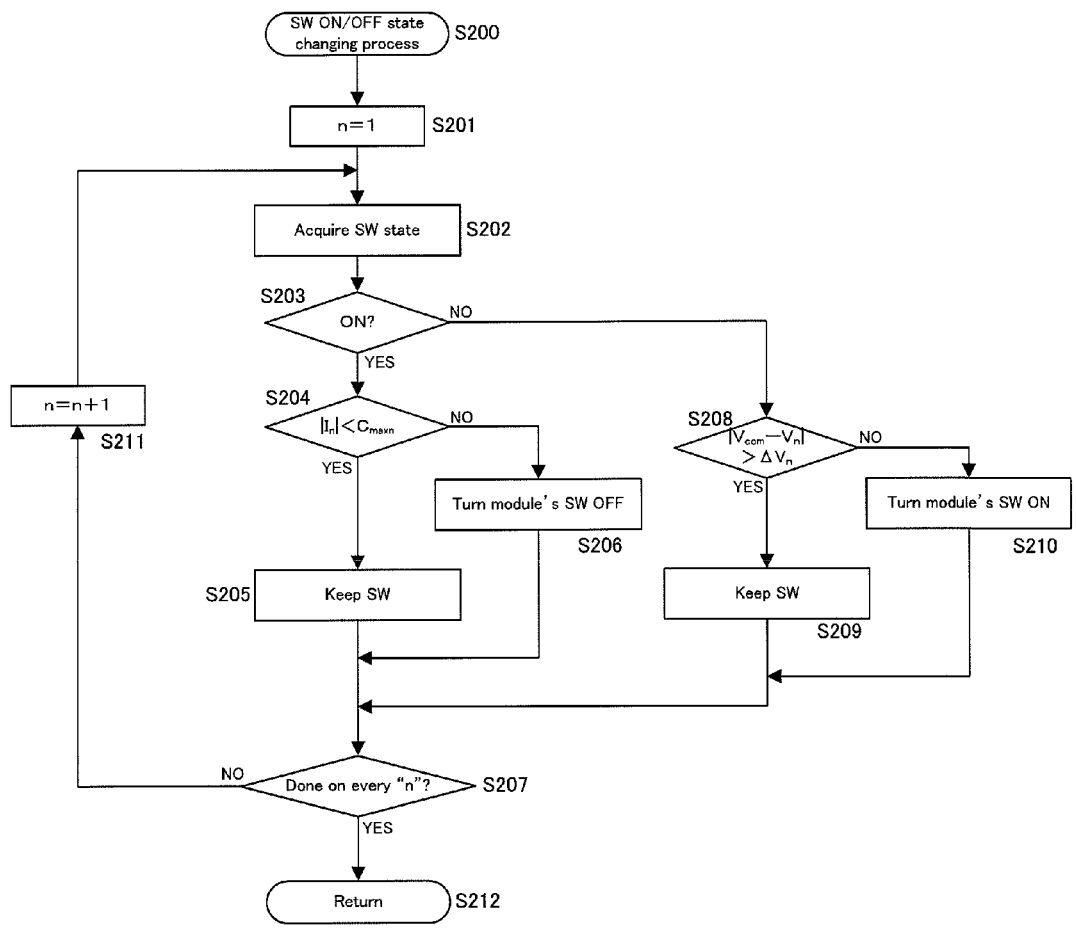
FIG. 4 is a diagram showing a flowchart of a SW ON/OFF state changing process subroutine of the battery module control system according to the embodiment of the present invention.

The following describes the subroutine of the SW ON/OFF state changing process at step S105 with reference to a flowchart. FIG. 4 is a diagram showing a flowchart of the SW ON/OFF state changing process subroutine of the battery module control system 1 according to the embodiment of the present invention.

In FIG. 4, after the SW ON/OFF state changing process subroutine is started at step S200, then the process proceeds to step S201, where as a n number that is an ID number of a battery module, the following is set: n=1. First, the state of the switch circuit $SW_1$, which is provided on the charge and discharge route of the battery module $M_1$, is checked.

At step S202, a switch state, which is about whether SWn is ON or OFF, is acquired. At step S203, a determination is made as to whether or not SWn is ON. When the determination result at step S203 is YES, the process proceeds to step SP204. When the determination result is NO, the process proceeds to step S208.

At step S204, a determination is made as to whether or not the following is satisfied: $|In|<C_{maxn}$. When the determination result at step S204 is YES, the process proceeds to step S205 because of the current situation where a safe level of current not exceeding $C_{maxn}$ flows into the battery module, and SWn is kept ON. When the determination result at step S204 is NO, the process proceeds to step S206 because of the current situation where a level of current exceeding $C_{maxn}$, at which safety cannot be guaranteed, flows into the battery module, and SWn is switched from being ON to being OFF.

At step S208, which the process proceeds to after it is determined at step S203 that SWn is OFF, a determination is made as to whether or not $|V_{com}-V_n|>\Delta V_n$. That is, at step S208, a determination is made as to whether a difference between a charge and discharge voltage value of the entire battery module control system 1 and the voltage of the module is over the allowable voltage difference.

When the determination result at step S208 is YES, it is expected that a level of current exceeding $C_{maxn}$, at which safety cannot be guaranteed, will flow into the battery module. Therefore, the process proceeds to step S209, and SWn is kept OFF.

When the determination result at step S208 is NO, it is expected that a safe level of current not exceeding $C_{maxn}$ will flow into the battery module. Therefore, SWn is controlled so as to be switched from being OFF to being ON.

At step S207, a determination is made as to whether or not the process has been performed for every "n." When the determination result at step S207 is NO, the process proceeds to step S211, where "n" is incremented by 1. Then, the process proceeds to step S202. When the determination result at step S207 is YES, the process proceeds to step S212, and returns to the original routine.

According to the above-described battery module control system 1 of the present invention, allowable voltage difference $\Delta V$ of each of the secondary battery modules is acquired through actual usage or the like. The switch circuits SWn, which are provided on the charge and discharge routes of the secondary battery modules, are so controlled that a voltage larger than the allowable voltage difference $\Delta V$ is not applied to the secondary battery modules (i.e. that a level of current exceeding $C_{maxn}$, at which safety cannot be guaranteed, does not flow into the battery modules). As a result, the use of the secondary battery modules in a safe usage range is guaranteed. Therefore, without providing a storage section or the like in the secondary battery modules to store a usage history thereof and the like, it is possible to reuse the secondary battery modules through a simple, inexpensive system.

Moreover, according to the battery module control system 1 of the present invention, a switch circuit SWn is controlled on the basis of allowable voltage difference $\Delta V$ as described above. Therefore, the safe use of an arbitrary secondary battery module is guaranteed. Even when a battery information storage section that is compliant with the standards is not provided, it is therefore possible to reuse an arbitrary secondary battery module.

The following provides a summary of the processing steps in the battery module control system according to the embodiment of the present invention. The battery module control system of the embodiment of the present invention contains the following two aspects: (1) an aspect that a voltage detected by a voltage detection section corresponding to a predetermined battery module is detected, and a switch circuit provided on a charge and discharge route of the predetermined battery module is on-off controlled on the basis of the detected voltage; and (2) an aspect that a current detected by a current detection section corresponding to a predetermined battery module is detected, and a switch circuit provided on a charge and discharge route of the predetermined battery module is on-off controlled on the basis of the detected current.

First, the processing steps associated with (1) will be summarized. FIG. 5 is diagrams showing a summary of the processing steps in the battery module control system according to the embodiment of the present invention. FIG. 5A is a diagram showing a summary of the steps performed until a module data table is created. FIG. 5B is a diagram showing a summary of the steps performed to reference the module data table and carry out the on-off control of a switch circuit on the basis of a voltage detected.

In FIG. 5A, first at step S11, average impedance values ($Z_1$, $Z_2$ and $Z_3$) of a plurality of battery modules ($M_1$, $M_2$ and $M_3$) are each calculated. As for the calculation of the average impedance values, the average impedance values can be calculated by dividing each of voltage values of the battery modules ($M_1$, $M_2$ and $M_3$) by a current value, and averaging the resulting values in an accumulative manner.

At the subsequent step S12, the maximum allowable charge-and-discharge rates ($Cmax_1$, $Cmax_2$ and $Cmax_3$) of a plurality of battery modules ($M_1$, $M_2$ and $M_3$) are each input. The input operation can be performed by using the input section 50.

At the next step S13, on the basis of the average impedance values ($Z_1$, $Z_2$ and $Z_3$) calculated by an average impedance value calculation step of step S11 and the maximum allowable charge-and-discharge rates ($Cmax_1$, $Cmax_2$ and $Cmax_3$) input at a maximum allowable charge-and-discharge rate input step of step S12, allowable voltage differences ($\Delta V_1$, $\Delta V_2$ and $\Delta V_3$) of a plurality of the battery modules ($M_1$, $M_2$ and $M_3$) are each calculated.

At step S14, each of the values that have been calculated and input as described above is stored in the module data table.

Then, as described above, the subsequent processing steps shown in FIG. 5B are performed by referencing the values stored in the module data table. Incidentally, in the case of FIG. 5B, when the charge-and-discharge control of a plurality of battery modules ($M_1$, $M_2$ and $M_3$) is continuously performed, the process returns to the first processing step from the last processing step to make a loop.

In FIG. 5B, first at step S21, the voltage ($V_{com}$) of a common charge and discharge route of a plurality of battery modules ($M_1$, $M_2$ and $M_3$) is detected by a common voltage detection section (74; the control section 10).

At the next step S22, the voltages ($V_1$, $V_2$ and $V_3$) of a plurality of battery modules ($M_1$, $M_2$ and $M_3$) are each detected by a plurality of voltage detection sections (71, 72 and 73; the control section 10).

At step S23, a determination is made as to whether or not a difference between the voltage ($V_{com}$) detected by the common voltage detection section and the voltage ($V_n$; n=1, 2 or 3) detected by a voltage detection section corresponding to a predetermined battery module is greater than an allowable voltage difference ($\Delta V_n$; n=1, 2 or 3) of the predetermined battery module.

When the determination result at step S23 is YES, the process proceeds to step S24, where a switch circuit ($SW_n$; n=1, 2 or 3) provided on a charge and discharge route of the predetermined battery module is so controlled as to be turned OFF.

When the determination result at step S23 is NO, the process proceeds to step S25, where a switch circuit ($SW_n$; n=1, 2 or 3) provided on a charge and discharge route of the predetermined battery module is so controlled as to be turned ON.

According to the above aspect based on (1), allowable voltage difference $\Delta V$ is used as a determination criterion, and a switch circuit $SW_n$ is controlled. Therefore, the safe use of an arbitrary secondary battery module is guaranteed. As a result, even when a battery information storage section that is compliant with the standards is not provided, it is possible to reuse an arbitrary secondary battery module.

The following provides a summary of the processing steps associated with (2). FIG. 6 is diagrams showing a summary of the processing steps in the battery module control system according to the embodiment of the present invention. FIG. 6A is a diagram showing a summary of the steps performed until a module data table is created. FIG. 6B is a diagram showing a summary of the steps performed to reference the module data table and carry out the on-off control of a switch circuit on the basis of a current detected.

In FIG. 6A, first at step S31, average impedance values ($Z_1$, $Z_2$ and $Z_3$) of a plurality of battery modules ($M_1$, $M_2$ and $M_3$) are each calculated. As for the calculation of the average impedance values, the average impedance values can be calculated by dividing each of voltage values of the battery modules ($M_1$, $M_2$ and $M_3$) by a current value, and averaging the resulting values in an accumulative manner.

At the subsequent step S32, the maximum allowable charge-and-discharge rates ($Cmax_1$, $Cmax_2$ and $Cmax_3$) of a plurality of battery modules ($M_1$, $M_2$ and $M_3$) are each input. The input operation can be performed by using the input section 50.

At step S33, each of the values that have been calculated and input as described above is stored in the module data table.

Then, as described above, the subsequent processing steps shown in FIG. 6B are performed by referencing the values stored in the module data table. Incidentally, in the case of FIG. 6B, when the charge-and-discharge control of a plurality of battery modules ($M_1$, $M_2$ and $M_3$) is continuously performed, the process returns to the first processing step from the last processing step to make a loop.

In FIG. 6B, first at step S41, the currents ($I_1$, $I_2$ and $I_3$) flowing through the charge and discharge routes of a plurality of battery modules ($M_1$, $M_2$ and $M_3$) are each detected by a plurality of current detection sections (91, 92 and 93).

At step S42, a determination is made as to whether or not an absolute value of a current value ($I_N$; N=1, 2 or 3) detected by a current detection section corresponding to a predetermined battery module is greater than a maximum allowable charge-and-discharge rate ($C_{max1}$, $C_{max2}$ or $C_{max3}$) of the predetermined battery module.

When the determination result at step S42 is YES, the process proceeds to step S43, where a switch circuit ($SW_n$; n=1, 2 or 3) provided on a charge and discharge route of the predetermined battery module is so controlled as to be turned OFF.

When the determination result at step S42 is NO, the process proceeds to step S44, where a switch circuit ($SW_n$; n=1, 2 or 3) provided on a charge and discharge route of the predetermined battery module is so controlled as to be turned ON.

According to the above aspect based on (2), a maximum allowable charge-and-discharge rate is used as a determination criterion, and a switch circuit $SW_n$ is controlled. Therefore, the safe use of an arbitrary secondary battery module is guaranteed. As a result, even when a battery information storage section that is compliant with the standards is not provided, it is possible to reuse an arbitrary secondary battery module.

According to the battery module control system and battery module control method of the present invention, it is possible to appropriately control a flow through an alternate-current switch (120), which makes up an uninterruptible power supply. Therefore, without using an expensive alternate-current switch (120) with a large overload capacity, an inexpensive power system can be built. Thus, the battery module control system and the battery module control method are extremely high in industrial applicability.

What is claimed is:

1. A battery module control system, comprising:
   a plurality of battery modules that are connected to each other in parallel;
   switch circuits that are provided on each charge and discharge routes of the plurality of battery modules;
   an average impedance value calculation section that calculates each average impedance values of the plurality of battery modules;
   a maximum allowable charge-and-discharge rate input section that inputs maximum allowable charge-and-discharge rates of the plurality of battery modules;
   an allowable voltage difference calculation section that calculates each allowable voltage differences of the plurality of battery modules on the basis of the average impedance values calculated by the average impedance value calculation section and the maximum allowable charge-and-discharge rates input by the maximum allowable charge-and-discharge rate input section;
   a common voltage detection section that detects a voltage of a common charge and discharge route of the plurality of battery modules; and
   a plurality of voltage detection sections that detect respective voltages of the plurality of battery modules, wherein
   when a difference between the voltage detected by the common voltage detection section and the voltage detected by the voltage detection section corresponding to a predetermined battery module is greater than an allowable voltage difference of the predetermined battery module, a switch circuit provided on a charge and discharge route of the predetermined battery module is so controlled as to be turned OFF, and
   wherein the maximum allowable charge-and-discharge rate is used to define a maximum current with which a certain battery module from among the plurality of battery modules can be charged and discharged.

2. The battery module control system according to claim 1, wherein
   the plurality of battery modules are produced at different times.

3. The battery module control system according to claim 1, wherein usage histories of the plurality of battery modules are different.

4. The battery module control system according to claim 1, wherein standards of the plurality of battery modules are different.

5. A battery module control system, comprising:
   a plurality of battery modules that are connected to each other in parallel:
   switch circuits that are provided on each charge and discharge routes of the plurality of battery modules in order to add a battery module to a common charge and discharge route of the plurality of battery modules, or cut off a battery module from the common charge and discharge route of the plurality of battery modules;
an average impedance value calculation section that calculates each average impedance values of the plurality of battery modules;
a maximum allowable charge-and discharge rate input section that inputs each maximum allowable charge-and-discharge rates of the plurality of battery modules;
an allowable voltage difference calculation section that calculates each allowable voltage differences of the plurality of battery modules on the basis of the average impedance values calculated by the average impedance value calculation section and the maximum allowable charge-and-discharge rates input by the maximum allowable charge-and-discharge rate input section;
a common voltage detection section that detects a voltage of a common charge and discharge route of the plurality of battery modules; and
the plurality of voltage detection sections that detect each voltages of the plurality of battery modules, wherein
when a switch circuit provided on a charge and discharge route of the predetermined battery module is turned OFF, and a difference between the voltage detected by the common voltage detection section and the voltage detected by the voltage detection section corresponding to a predetermined battery module is greater than an allowable voltage difference of the predetermined battery module, a switch circuit provided on a charge and discharge route of the predetermined battery module is so controlled as to be turned OFF and cut off the predetermined battery module from the common charge and discharge route,
when a switch circuit provided on a charge and discharge route of the predetermined battery module is turned OFF, and a difference between the voltage detected by the common voltage detection section and the voltage detected by the voltage detection section corresponding to a predetermined battery module is smaller than an allowable voltage difference of the predetermined battery module, a switch circuit provided on a charge and discharge route of the predetermined battery module is so controlled as to be turned ON and add the predetermined battery module to the common charge and discharge route, and
wherein the maximum allowable charge-and-discharge rate is used to define a maximum current with which a certain battery module from among the plurality of battery modules can be charged and discharged.

* * * * *